United States Patent [19]

Pavlica et al.

[11] Patent Number: 5,261,454
[45] Date of Patent: Nov. 16, 1993

[54] MULTIPORT SELECTOR VALVE

[75] Inventors: James J. Pavlica, East Northport; Joseph C. Pellegrino, Baldwin, both of N.Y.

[73] Assignee: Grumman Aerospace Corporation, Bethpage, N.Y.

[21] Appl. No.: 982,960

[22] Filed: Nov. 30, 1992

[51] Int. Cl.⁵ .............. F16K 11/065; F16K 25/02; F16K 3/20
[52] U.S. Cl. .................. 137/625.48; 251/172; 251/327; 251/174
[58] Field of Search .......... 251/172, 174, 368, 327; 137/625.48

[56] References Cited

U.S. PATENT DOCUMENTS

| | | | |
|---|---|---|---|
| 3,776,276 | 12/1973 | Stiltner | 251/172 X |
| 4,088,152 | 5/1978 | Baugh | 251/172 X |
| 4,572,298 | 2/1986 | Weston | 137/625.48 X |
| 4,579,143 | 4/1986 | Rollins et al. | 137/625.48 |

Primary Examiner—Arnold Rosenthal
Attorney, Agent, or Firm—Pollock, VandeSande & Priddy

[57] ABSTRACT

A multiport selector valve incorporates a polished interface between a respective poppet of each port and a displaceable valve spool. A controlled gap exists between each poppet and its respective port fitting to pressurize a recess in which an O-ring is seated during operation of the valve. This results in the O-ring seal being urged against a confronting surface of the poppet which increases the contact force between optical surfaces of the poppet and the spool, particularly during periods of dynamic flow. The construction of the valve results in a unit of high reliability and useful life with attendant reduction of replacement costs.

10 Claims, 3 Drawing Sheets

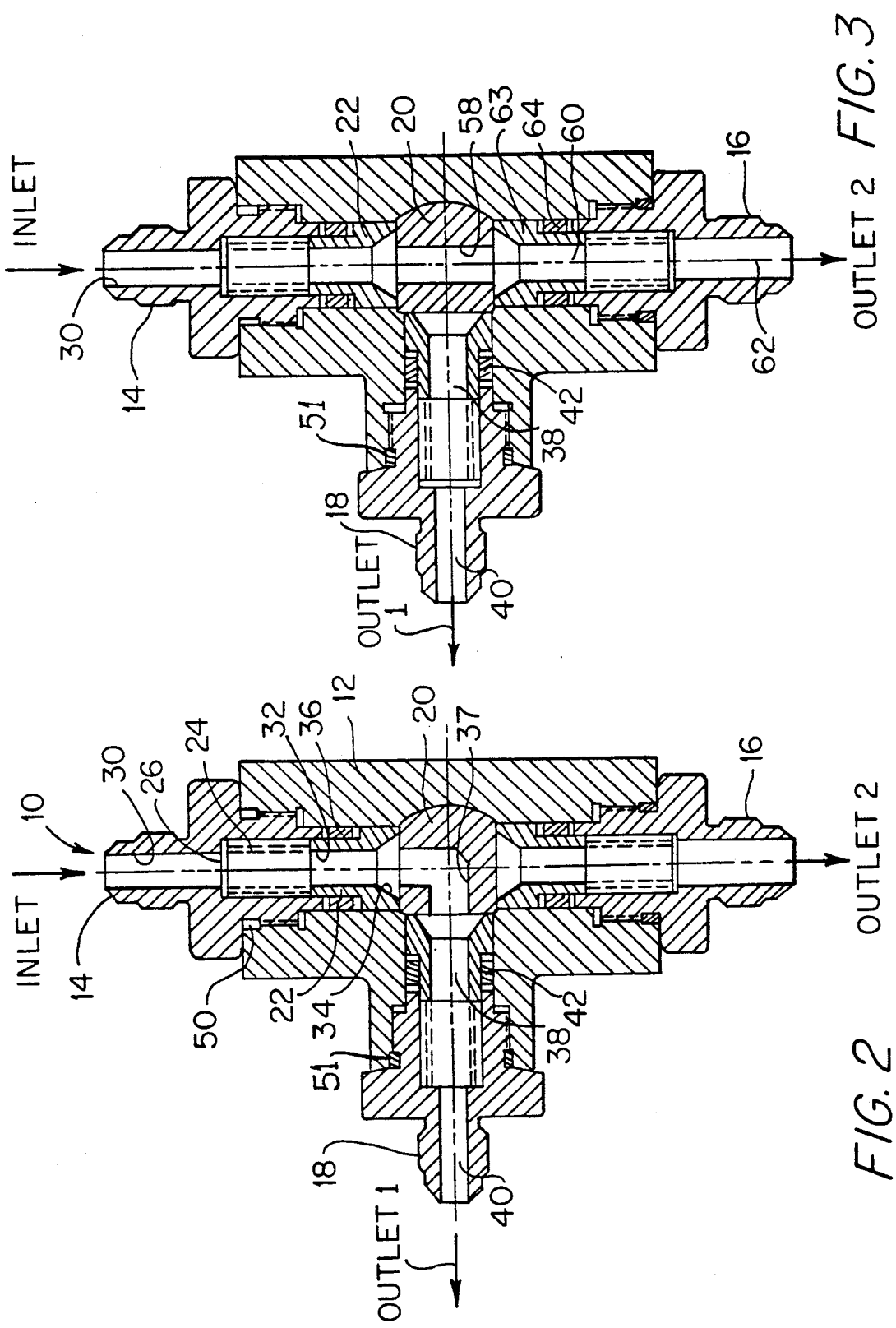

MULTIPORT SELECTOR VALVE

FIELD OF THE INVENTION

The present invention relates to valves, and more particularly to a valve having a single inlet, but not necessarily limited to a single inlet, and multiple outlets which are individually selectable by actuation of a valve spool.

BACKGROUND OF THE INVENTION

Selectable valves are frequently used in applications which involve hydraulics, pneumatics, and pyrotechnics. Typically, a single inlet may be selectively switched between multiple outlet ports by displacing a translatable valve spool. A typical application is in the field of pyrotechnic pilot seat ejection from a military aircraft. For example, with the valve spool positioned in a first location, the first occupant's seat ejection mechanism will be effected. If the valve spool is displaced to a second position, the inlet pyrotechnic charge flow is diverted thereby enabling seat ejection for a second aircraft occupant. Accordingly, the same valve may be used for sequentially ejecting two seats.

O-ring seals are frequently used at the sliding seal interface between a valve spool and a poppet. In the case of pyrotechnic applications, high dynamic flow and repeated use cause rapid deterioration or damage of such seals, thereby shortening the useful life of the valve. Further, such high dynamic loads tend to induce reaction forces on the poppet, which prevents it from providing a continuous intimate seal with the spool.

BRIEF DESCRIPTION OF THE PRESENT INVENTION

The present invention solves the aforementioned problems by incorporating optically flat surfaces at the poppet-spool interface. Such smooth surfaces create a seal at the interface, thereby obviating the need for an O-ring there at.

The present invention does incorporate O-ring seals between the poppet and valve housing surfaces, but in a nonvulnerable position. A controlled gap exists along an interface between an inlet fitting and its correspondingly positioned poppet so as to create a high pressure passage to the O-ring seal recess. During fluidic actuation pressure is brought to bear against the O-ring and by the O-ring against an adjacently positioned poppet surface so as to urge the poppet against the spool with great force during such pyrotechnic actuation.

Accordingly, the present invention offers a solution to reliability problems in multiport selection valves with the attendant advantage of high pressure seals during use of the valve. In the following discussion of the invention, it is to be appreciated that the valve has equal application in the general field of fluidics so as to incorporate hydraulics, pneumatics, and pyrotechnics.

BRIEF DESCRIPTION OF THE FIGURES

The above-mentioned objects and advantages of the present invention will be more clearly understood when considered in conjunction with the accompanying drawings, in which:

FIG. 2 is a side sectional view of the valve as illustrated in FIG. 1;

FIG. 3 is a sectional view similar to that of FIG. 2 but with the spool translated to a second switched position.

DETAILED DESCRIPTION OF THE INVENTION

Figure 1:
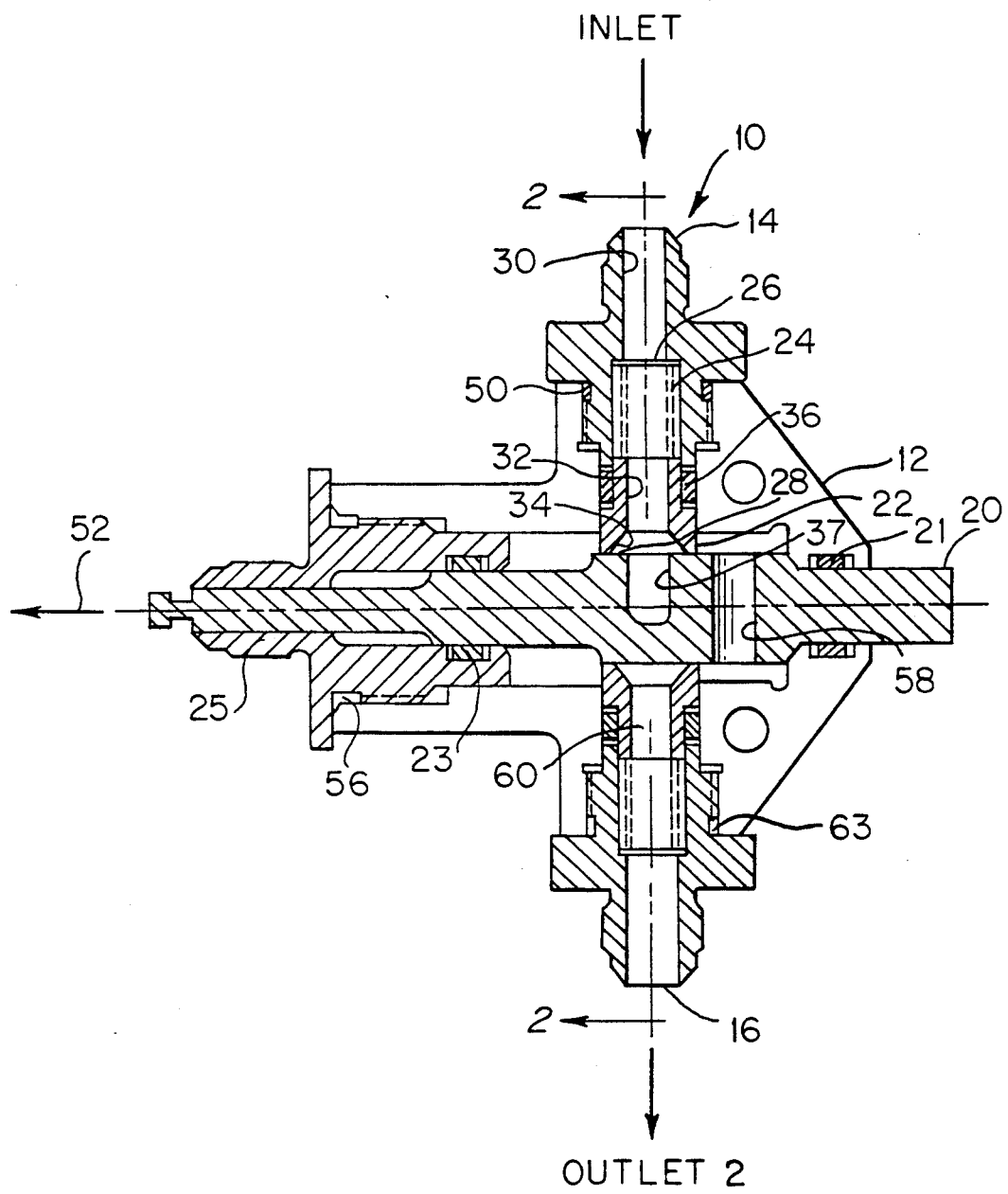
FIG. 1 is a sectional view of the present valve illustrating a centrally disposed spool in a first switched position.

Referring to the figures, and more particularly FIG. 1, reference numeral 10 generally denotes the selector valve of the present invention which is applicable to fluidic applications, generally. Typical specific examples for such valve use include the fields of pyrotechnics, hydraulics, and pneumatics. Valve 10 includes a housing 12, to which is secured a first inlet port fitting 14. The inlet port selectively services two outlet ports 16 (FIG. 1) and 18 (FIG. 2). However, the utilization of a single inlet port and two outlet ports is given by way of example and is not intended to be a limitation of the invention.

A centrally located balanced spool 20 serves as an actuated switching device for the valve. An O-ring 21 is recessed within the housing and forms a seal contact with a first end of spool 20. In FIG. 1 the left illustrated end of housing 12 has a gland fitting 25 threaded into it and an O-ring 23, recessed within the gland fitting, sealingly contacts the second end spool 20. In the case of the two outlet ports discussed in the pressent invention, the spool 20 assumes one of two positions relative to the housing. Passageways within the spool selectively connect the inlet port to one or the other of the outlet ports, as will be presently explained. A poppet 22 is received within a cylinder formed in the housing, the poppet having a frusto-conical inward end 34 which bears against a falt 28 formed in spool 20. The intercace surfaces of the flat and the end of frusto-conical opening 34 are optical so that an excellent seal occurs at the interface without the utilization of an O-ring which would quickly becomes damaged or deteriorated after repeated use. The poppet includes a throughbore 32 for coaxially communicating with the passageway 30 formed in inlet port fitting 14.

Figure 2A:
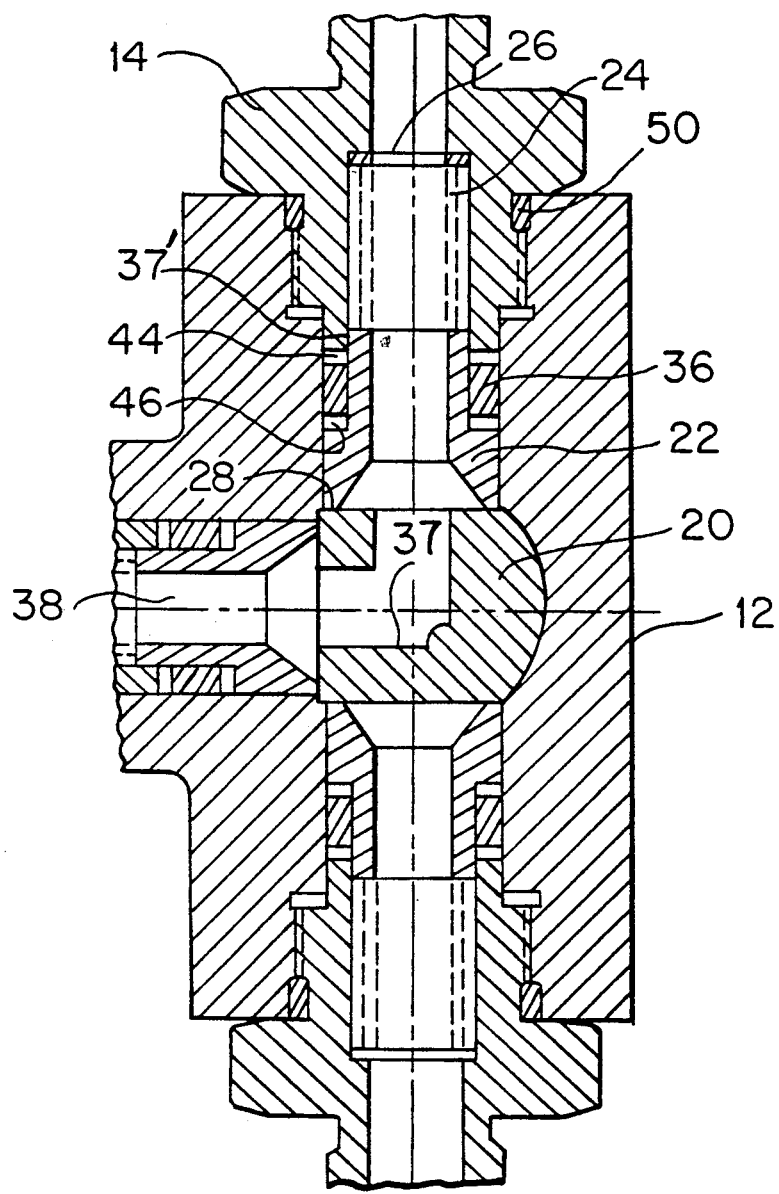
FIG. 2A is a partial enlarged view of the structure shown in FIG. 2.

Reference is now made to FIG. 2A which shows the installed poppet 22 in greater detail. As will be observed, an O-ring 36 creates a seal between the outer surface of poppet 22 and a confronting surface of housing 12. A controlled gap between the poppet 22 and inlet port fitting 14 is indicated by reference numeral 37'. This gap, typically 0.010 inch, allows the flow of pressurized fluid into an annular space occupied by back-up ring 44, adjacent the O-ring 36, thereby urging the O-ring to bear against the confronting back-up ring 46 when inlet flow to the valve occurs. The result is a dampened environment for maintaining close contact between the poppet and the spool along their optical interface 48 during periods of high dynamic flow which might otherwise cause poppet bounce. The poppet 22 is normally maintained in bias contact with the spool 20 by means of a spring 24 (FIG. 1) which bears against a seated washer 26 received within the central passageway formed in inlet port fitting 14. An opposite end of the spring bears against an end of poppet 22. While observing the figures, it will be noticed that a similar pressurized O-ring seal and spring assembly characterizes both of the selectable outlets.

A first outlet port fitting 18 is shown in greater detail in FIG. 2. It will be observed in this figure that the fitting includes a central passageway, as was the case with the inlet fitting, and a poppet identical to that of 22 likewise includes a central opening 38 identical to that of poppet 22. This latter poppet has an O-ring 42 around it to create a seal with a confronting surface of housing 12. Since each of the port fittings is threadingly received within the housing, port fitting seals such as 50, 51, 56, and 63 are appropriately employed.

In FIGS. 1, 2, and 2A, the spool 20 is illustrated in a first switched position wherein poppet 22 communicates with an elbow-shaped passageway 37 formed in spool 20. The inlet to the elbow-shaped passageway 37 communicates with the frusto-conical opening 34 of poppet 22 while the outlet of the passageway 37 (FIG. 2) communicates with the passageway 38 formed in the poppet associated with the first outlet port fitting 18. Thus, with the spool disposed in the illustrated position of these figures, inlet flow will be diverted through passageway 40 of the outlet port fitting 18. It is to be noted that the poppet-slide interfaces for both outlet ports are identical to those explained in connection with the inlet port.

Typically, a cord or other actuator may be connected to actuation end 52 of spool 20. By pulling on this end, the spool 20 translates to the left, as shown in FIG. 3 so that the elbow-shaped passageway 37 no longer remains in communication with the inlet port. Rather, an adjacently situated throughbore 58 becomes aligned with the inlet poppet 22 thereby providing a path for straight flow between the inlet and the second outlet port fitting 16 via coaxial bores 60 and 62 respectively located in lower poppet 63 and outlet port fitting 16. An O-ring 64 seals the space between the housing 12 and the poppet 63.

As will be appreciated, upon actuation of spool 20 to the switch position of FIG. 3, inlet flow is exclusively channeled to the in-line second outlet port to the exclusion of the first outlet port.

In a typical application for pilot ejection seats employing pyrotechnics, the spool 20 may assume the first condition shown in FIGS. 1 and 2 wherein the total pressurized inlet flow passes out through the first outlet port fitting 18 (dump) thereby permitting the actuation of a conventional seat ejection mechanism (not shown) of a first occupant only of an aircraft. When the spool 20 is displaced to the second position instead of the first position, illustrated in FIG. 3, wherein the total inlet flow is passed through the second outlet port fitting 16 thereby permitting the sequencing a second ejection. It is desirable to have the spool 20 visible so that its positional condition can be quickly ascertained.

By virtue of the foregoing disclosure, a selector valve has been discussed which offers high reliability and useful life with resulting reduced operational costs.

It should be understood that the invention is not limited to the exact details of construction shown and described herein for obvious modifications will occur to persons skilled in the art.

We claim:
1. A multiport selection valve comprising:
a housing;
an inlet fitting connected to the housing for admitting fluid into the valve;
an inlet poppet slidably and coaxially mounted in the inlet fitting and communicating with a passage in the inlet fitting to pass fluid through the poppet;
an elongated, translatable valve spool located in the housing and transversely positioned relative to the poppet, the poppet seated against the spool;
a first outlet fitting connected to the housing and perpendicularly oriented with respect to the inlet fitting, the first outlet fitting selectably communicable, through the spool, with the inlet fitting;
a first outlet poppet slidably and coaxially mounted in the first outlet fitting and seated against the spool;
a first passageway formed through the spool and positioned between the inlet and the first outlet poppet when the spool is moved to a first translated position thus completing a fluid path from the inlet through the first outlet fitting;
a second outlet fitting connected to the housing and selectably communicable, through the spool, with the inlet fitting;
a second outlet poppet slidably and coaxially mounted in the second outlet fitting and seated against the spool;
a second passageway formed through the spool and positioned between the inlet and the second outlet when the spool is moved to a second translated position;
poppet seals received within recesses formed between a wall of each poppet and an adjacent inner housing surface;
a preselected gap existing between each poppet and a respective fitting thereby creating a flow path from the inlet to the recesses of the inlet poppet seal and one or the other of the outlet poppets thereby urging the seals to bear against an adjacent poppet surface which results in increased sealing contact between the inlet poppet and the spool and one or the other operational outlet poppets.

2. The valve set forth in claim 1 wherein the first outlet fitting is perpendicularly oriented with respect to the inlet fitting.

3. The valve set forth in claim 1 wherein the second outlet fitting is oriented in colinear relation to the inlet fitting.

4. The valve set forth in claim 1 wherein the first passageway is elbow shaped.

5. The valve set forth in claim 1 wherein the second passageway is a throughbore.

6. The valve set forth in claim 1 wherein the spool includes a flat, optical surface around each opening of the first and second passageways;
and further wherein a confronting end of each corresponding poppet is an optical surface so that the interface between each poppet and a respectively contacting spool area serves as a seal.

7. The valve set forth in claim 1 wherein the poppet seals received within the recesses are O-rings.

8. A multiport selection pyrotechnic valve for pilot seat ejection mechanisms, comprising:
a housing;
an inlet fitting connected to the housing for admitting fluid into the valve;
an inlet poppet slidably and coaxially mounted in the inlet fitting and communicating with a passage in the inlet fitting to pass fluid through the poppet;
an elongated, translatable valve spool located in the housing and transversely positioned relative to the poppet, the poppet seated against the spool;
a first outlet fitting connected to the housing and selectably communicable, through the spool, with the inlet fitting, the outlet fitting being transversely aligned with the input fitting;

a first outlet poppet slidably and coaxially mounted in the first outlet fitting and seated against the spool;

an elbow shaped passageway formed through the spool and positioned between the inlet and the first outlet poppet when the spool is moved to a first translated position thus completing a fluid path from the inlet through the first outlet fitting;

a second outlet fitting connected to the housing and selectably communicable, through the spool, with the inlet fitting, the second outlet fitting being co-linearly aligned with the inlet fitting;

a second outlet poppet slidably and coaxially mounted in the second outlet fitting and seated against the spool;

a throughbore formed through the spool and positioned in-line between the inlet and the second outlet when the spool is moved to a second translated position;

the spool having a flat, optical surface around each opening of the first and second passageways;

wherein a confronting end of each corresponding poppet is an optical surface so that the interface between each poppet and a respectively contacting spool area form a seal;

poppet O-ring seals located in recesses formed between a wall of each poppet and an adjacent inner housing surface;

a preselected gap existing between each poppet and a respective fitting thereby creating a flow path from the inlet to the recesses of an inlet poppet seal and one or the other of the outlet poppets thereby urging the seals to bear against an adjacent poppet surface which results in increased sealing contact between the inlet poppet and the spool and one or the other operational outlet poppets.

9. The valve set forth in claim 8 together with attachment means formed on one end of the spool for facilitating spool translation.

10. The valve set forth in claim 8 together with spring means located in each fitting and contacting a corresponding poppet for biasing the poppets against the spool.

* * * * *